(12) United States Patent
Bedoin et al.

(10) Patent No.: US 8,936,213 B2
(45) Date of Patent: Jan. 20, 2015

(54) ENGINE PYLON COMPRISING A VORTEX GENERATOR, AND METHOD FOR THE PRODUCTION THEREOF

(75) Inventors: Steve Bedoin, Toulouse (FR); Cyril Bonnaud, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 270 days.

(21) Appl. No.: 13/508,283

(22) PCT Filed: Oct. 27, 2010

(86) PCT No.: PCT/FR2010/052299
§ 371 (c)(1), (2), (4) Date: Jul. 23, 2012

(87) PCT Pub. No.: WO2011/055062
PCT Pub. Date: May 12, 2011

(65) Prior Publication Data
US 2012/0273610 A1  Nov. 1, 2012

(30) Foreign Application Priority Data
Nov. 6, 2009 (FR) ..................... 09 57891

(51) Int. Cl.
*B64D 27/00* (2006.01)
*B64C 7/02* (2006.01)
*B64C 23/06* (2006.01)
*B64D 29/02* (2006.01)
*F02C 7/20* (2006.01)

(52) U.S. Cl.
CPC . *B64C 7/02* (2013.01); *B64C 23/06* (2013.01); *B64D 29/02* (2013.01); *F02C 7/20* (2013.01); *Y02T 50/162* (2013.01); *Y02T 50/671* (2013.01); *F05D 2240/127* (2013.01)

USPC .......................................... 244/54; 244/199.1

(58) Field of Classification Search
USPC .............. 244/54, 198, 199.1, 200.1; 248/554; 60/796, 797
See application file for complete search history.

(56) References Cited

U.S. PATENT DOCUMENTS

| 4,466,587 | A | 8/1984 | Dusa et al. |
| 5,102,069 | A * | 4/1992 | Hackett et al. .................. 244/54 |
| 2008/0067292 | A1 | 3/2008 | Bonnaud et al. |
| 2009/0230251 | A1 | 9/2009 | Bonnaud et al. |

FOREIGN PATENT DOCUMENTS

| FR | 2 905 930 | 3/2008 |
| GB | 2 112 077 | 7/1983 |

OTHER PUBLICATIONS

International Search Report issued on Mar. 2, 2011 in PCT/FR2010/052299 filed on Oct. 27, 2010.

* cited by examiner

*Primary Examiner* — Philip J Bonzell
*Assistant Examiner* — Nicholas McFall
(74) *Attorney, Agent, or Firm* — Oblon, Spivak, McClelland, Maier & Neustadt, L.L.P.

(57) ABSTRACT

The invention relates to a method for manufacturing an engine pylon (7) to be mounted between an engine (1) and an aircraft wing (6), said method comprising: mounting a pylon box (8) around a main structure (9), the box having a substantially oblong shape along which an air boundary layer (C) is formed while in flight; mounting at least one vortex generator (2) onto the pylon box such that a thickness (e) of the boundary layer is changed; and previously determining the shape of the pylon on the basis of the changed thickness of the boundary layer and the position of the vortex generators.

6 Claims, 4 Drawing Sheets

Section A-A

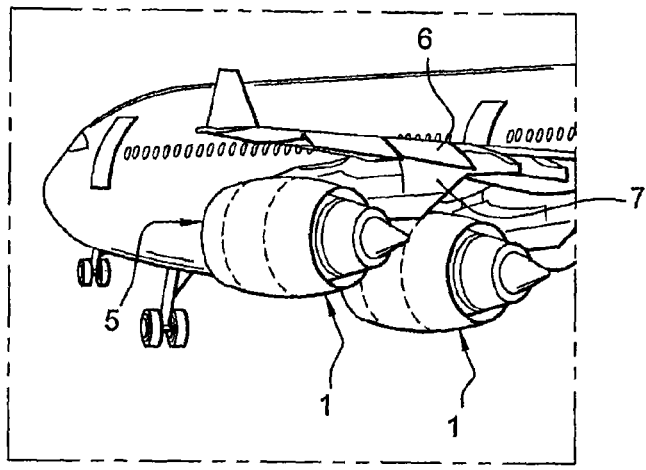
Fig. 1
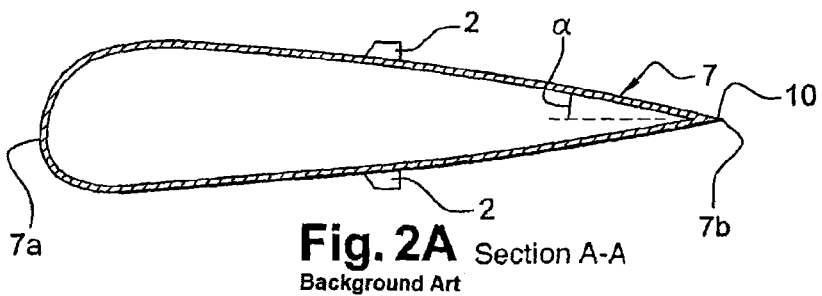
Fig. 2A Section A-A
Background Art
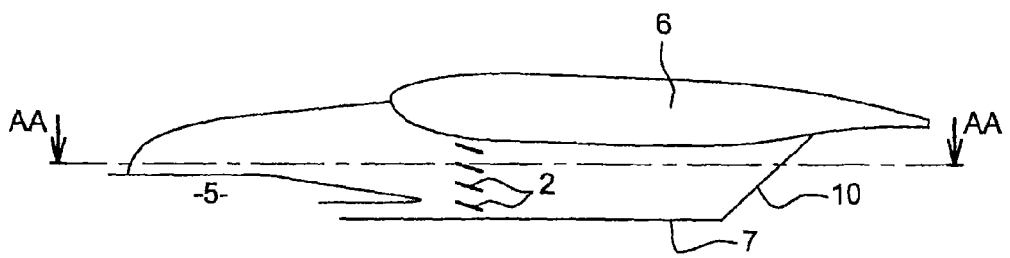
Fig. 2B
Background Art
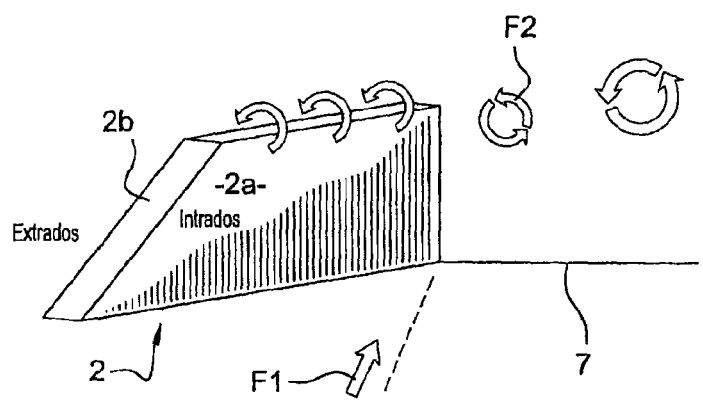
Fig. 3
Background Art Section A-A Section A-A

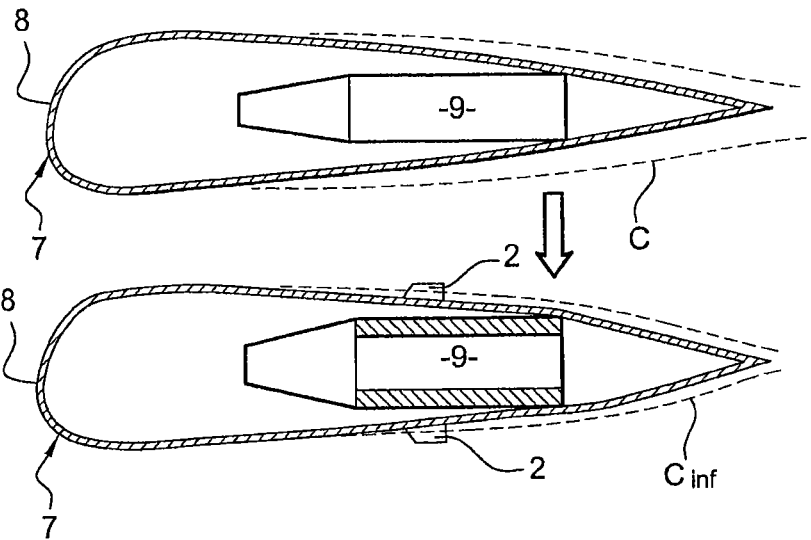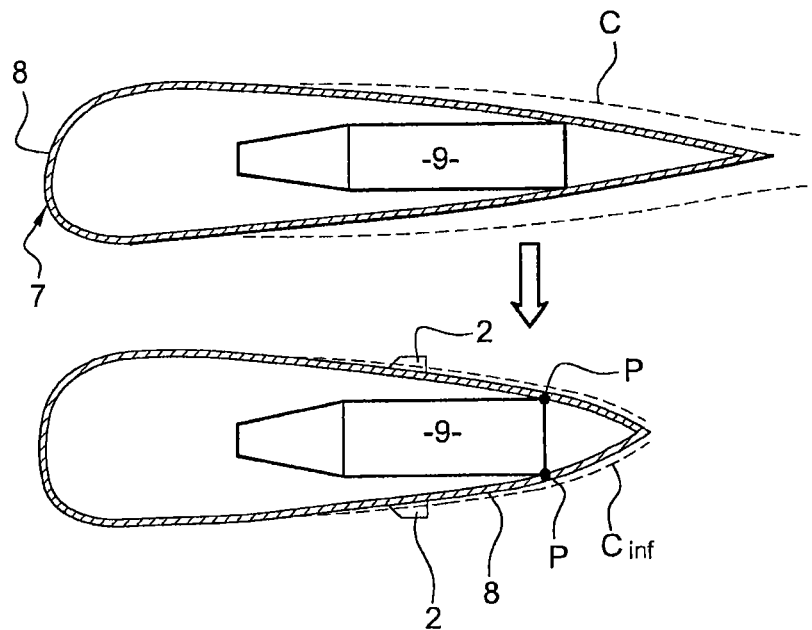

Section A-A

Section A-A

ENGINE PYLON COMPRISING A VORTEX GENERATOR, AND METHOD FOR THE PRODUCTION THEREOF

FIELD OF THE INVENTION

The invention pertains to a method for manufacturing an engine pylon to be mounted between an aircraft jet engine and an aircraft wing structure. This method consists in equipping the pylon with at least one vortex generator enabling, indirectly, the modification of the shape of the pylon.

The invention can be applied in the field of aeronautics and especially in the field of the manufacture of jet engine pylons.

PRIOR ART

Present-day aircraft are, for the most part, equipped with structural pylons suspended from their wing structure and providing a link between their engines and the wing structure. These structural pylons protrude from the undersurface of the wing structure. They give rise to aerodynamic disturbances on the wing structure and, generally, on the entire aircraft. These aerodynamic disturbances have detrimental effects such as lost of lift and an increase in drag. Furthermore, these aerodynamic effects are reinforced by the fact that, for structural reasons, the pylons have a relatively big width with a trailing edge close to the trailing edge of the wing structure and a proximity such as this of the trailing edges increases the risks of local flow separation along the aircraft.

FIG. 1 shows an example of a four-engine aircraft, only two engines 1 of which are visible. Each of these engines 1 is installed in a nacelle 5 fixed to the wing structure 6 by means of a pylon 7. The nacelle 5 is mounted along the longitudinal axis of the aircraft. To obtain the least unfavourable possible aerodynamic performance, the shape of the jet engine pylon is streamlined. Generally, the engine pylon has the shape of an elongated drop of water, i.e. an oblong shape, with a first rounded end and rectilinear flanks that meet at a pointed tip at a second end, as shown in FIG. 2A. This FIG. 2A shows a top view of a classic engine pylon. It must be noted that the rounded end 7a of the engine pylon is directed towards the front of the aircraft while the pointed end 7b is directed towards the rear of the aircraft, the front of the aircraft being the nose of the aircraft.

The pylon 7 of FIG. 2A is also shown in a profile view in FIG. 2B. This FIG. 2B shows that the engine pylon 7, also simply called a pylon, is hooked to the wing structure 6 and supports the nacelle 5. This engine pylon 7, comprises:
- a structure, called a main structure, providing the mechanical link between the wing structure and the engine and, therefore, the transmission of the forces emitted by the motor of the engine towards the entire aircraft, in passsing through the wing structure, and
- a box surrounding the main structure and having a streamlined shape.

The pylon 78 forms, with the wing structure 6, a boat tail angle α. This boat tail angle generally ranges from 10° to 20°.

When an aircraft is in flight, the the air flows along the aircraft and forms, along the structure, a boundary layer. This boundary layer is a thickness of turbulent air flow between the surface of the box and the flow of external air. In the boundary layer, the air has zero speed, thus creating turbulence. On the contrary, the external air flowing at a certain distance from the surface of the box of the pylon has a speed sufficient to prevent turbulence.

It must be noted that the thickness of the boundary layer 10 of the pylon depends on the length of the pylon, called the chord length, and on the boat tail angle α. If the boat tail angles are too small, then the pylon is too long and generates much drag. If the boat tail angles are too great, there is a risk of air flow separation, and this also gives rise to drag. Aeronautical manufacturers therefore seek a compromise on the boat tail angles in order to limit the drag.

If, despite this aerodynamic comprise, the aircraft in flight undergoes air flow separation, then the engine pylons can be equipped with vortex generators. Classically, these vortex generators, referenced 2 in FIGS. 2A and 2B, are mounted on the box of the pylon, after the designing and fabrication of the aircraft. They are mounted on the box of the pylon after the aeronautical builder has seen that there exist air flow separations, in flight. These vortex generators 2 are fins laid out so as to project on to the box of the pylon 7 in order to modify the flow of air along said pylon. These vortex generators 2 mix air from the boundary layer with air from the external layer, thus making possible to increase the speed of the air in immediate proximity to the pylon, thus preventing air flow separations. The role of such a vortex generator is shown schematically in FIG. 3. This figure, by means of an arrow F1, shows the local air flow along a pylon 7. It also shows, by means of the arrows F2, the air vortices generated by the vortex generators 2, these vortices being the consequence of the air winding that occurs at the end of the fins 2 owing to the difference in pressure between the underface 2a and the upper face 2b of the fin.

An example of vortex generators, to be installed after manufacture of the aircraft to modify the flow of air along the pylon, is described in the French patent application FR-2 905 930. The system of fins described in this document makes it possible to adapt the engine pylon of an aircraft to the working conditions of said aircraft. However, these fins nececessarily lead to an increase in the total mass of the aircraft as compared with the mass planned during its designing, as well as to a drag increment related to the fin itself.

Besides, aeronautical builders are constantly seeking to improve the aerodynamic performance of an aircraft. This performance can be increased in different ways:
- either by improving the drag, i.e. by by diminishing it,
- or by diminishing the mass of the aircraft.

However, the drag and the mass of an aircraft are directly related to each other. Indeed, to diminish the drag, the vortex generators can be installed on the engine pylon. Now, these vortex generators have a non-negligible mass which increases the total mass of the aircraft. And if no vortex generator is installed, the drag of the aircraft remains relatively high because of the flow separations.

SUMMARY OF THE INVENTION

The invention is aimed precisely at overcoming the drawbacks of the techniques explained here above. To this end, the invention proposes the manufacture of engine pylons for aircraft integrating, at the very time of their designing, vortex generators. Since these vortex generators are integrated into the pylon of the aircraft at the designing itself of said aircraft, the dimensions of the engine pylon can be modified in order to gain in mass without however giving rise to deleterious aerodynamic effects.

More specifically, the invention pertains to a method for manufacturing an engine pylon designed to be mounted between a jet engine and a wing structure (6) of an aircraft comprising:
- an operation for mounting a pylon box around a main structure, the box having an appreciably oblong shape along which a air boundary layer is formed in flight an operation for mounting at least one vortex generator on the box of the pylon so that the thickness of the boundary layer on the trailing edge of the pylon is modified, characterized in that it comprises, preliminarily, an operation for determining the shape of the pylon as a function of the modified thickness of the boundary layer and of the positioning of the vortex generators.

The method of manufacture of the invention may comprise one or more of the following characteristics:

vortex generators are mounted symmetrically on either side of the box of the pylon.

the shape of the pylon is determined so that the main structure has a widened surface in order to improve an absorption of forces coming from the jet engine;

the shape of the pylon is determined so that a length of the box is shortened, at least one vortex generator is mounted on only one side of the box of the pylon, inducing an effect of curvature of the aerodynamic shape of the pylon.

The invention also pertains to an engine pylon for aircraft, manufactured according to the method described here above.

The invention also pertains to an aircraft comprising a wing structure, at least one jet engine and an engine pylon connecting the wing structure and the engine, said engine pylon being fabricated according to the method described here above.

BRIEF DESCRIPTION OF THE DRAWINGS

FIG. 1, already described, represents a side view of an aircraft with two engines.

FIGS. 2A and 2B, already described, represent a classic engine pylon equipped with vortex generators.

FIG. 3, already described, schematically describes the flow of air in the vicinity of a vortex generator.

FIGS. 6A and 6B represent a top view of an engine pylon made according to a first embodiment of the method according to the invention.

FIGS. 7A and 7B represent a top view of an engine pylon made according to a second embodiment of the method according to the invention.

DETAILED DESCRIPTION OF EMBODIMENTS OF THE INVENTION

The invention proposes a method for manufacturing an engine pylon in which the vortex generators are mounted on the pylon at the very time of the designing of said pylon. The fact of integrating vortex generators during the designing of the engine pylon makes it possible to reduce the thickness of the boundary layer in flight as compared with an engine pylon designed classically without any vortex generator. This gain in thickness of the boundary layer modifies the shape of the engine pylon so as to obtain a gain in mass. It is thus possible to improve the drag (by diminishing the boundary layer) and/or diminish the total mass of the aircraft (by modifying the shape of the engine pylon).

The shape of the pylon is determined so as to increase the boat tail angles between the wing structure 6 and the engine pylon 7. Indeed, increasing the boat tail angles without degrading the aerodynamic performance makes it possible to improve the characteristics of the aircraft. In other words, the method of the invention makes it possible to diminish the mass for equal drag or to diminish the drag for equal mass.

Throughout the description of the invention, the diminishing or increasing of the mass, drag or shape of the pylon shall be established as compared with a classic aircraft of the same type, equipped with an engine pylon without vortex generator, or an engine pylon with vortex generator mounted after manufacture. In other words, these comparisons are made for characteristics of identical pylons manufactured firstly according to the method of the invention and, secondly, according to a conventional method.

The method of the invention therefore proposes to integrate vortex generators at the aircraft designing stage itself and to mount them during the manufacture of the aircraft in order to benefit from the advantages provided by these vortex generators to modify the shape of the engine pylon.

The vortex generators are small surfaces which, in the manner of a wing, produce a vortex wake downstream from their trailing edge. The invention uses these vortex generators by placing them so as to treat a well-defined zone of the flanks of the pylons. These vortex generators can have, for example, the following dimensions: a height of a few centimeters to a few decimeters, a length preferably equal to or greater than three times the height and a leading edge of 20 to 90 degrees. The vortex generators then act by mixing air outside the boundary layer (highly energized air) with air from the boundary layer that has lost energy. The behaviour of the boundary layer is improved and its thickness reduced.

Figure 4A:
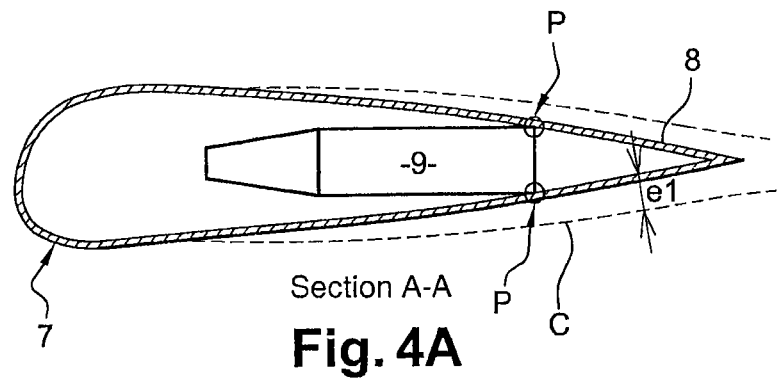
FIGS. 4A and BB, respectively represent a side view and a top view of a structure of the engine pylon.
Figure 4B:
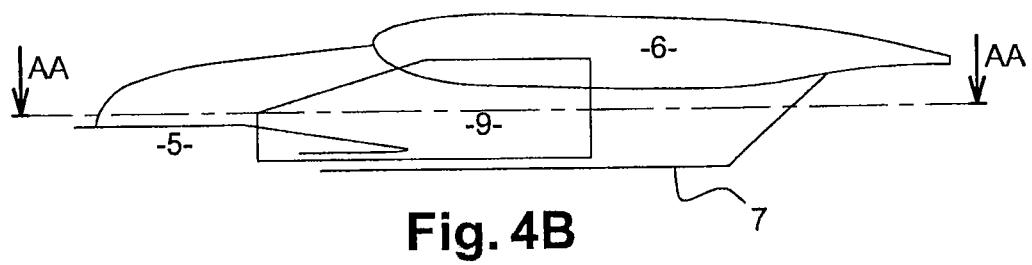

FIGS. 4A and 4B show an example of an engine pylon 7, with its box 8 and its main structure 9. The main structure 9 of the pylon 7 indicates the dimensioning points P of the aerodynamic shape of the pylon, i.e. the hardpoints by which the box must necessarily pass to provide the mechanical link between the engine and the wing structure. In this example, the engine pylon has no vortex generator. FIG. 4A shows, in dashes, the boundary layer C corresponding to the aerodynamic shape of the box 8 of the pylon 7 without vortex generator. In the example of FIGS. 4A and 4B, the boundary layer has a thickness e1.

Figure 5A:
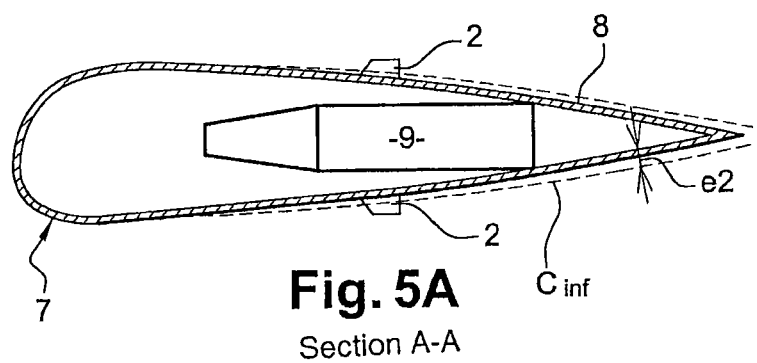
FIGS. 5A and 5B represent the structure of the FIGS. 4A and 4B when the engine pylon is equipped with vortex generators.
Figure 5B:
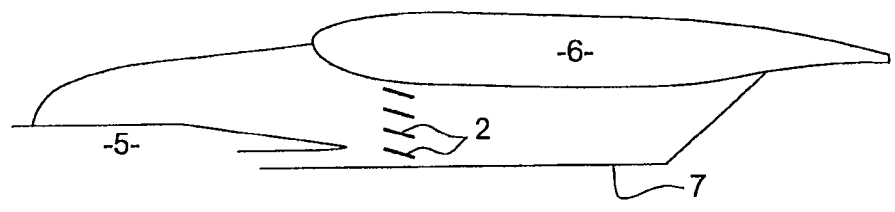

FIGS. 5A and 5B show the same pylon 7 as FIGS. 4A and 4B, but in the case where the pylon is provided with vortex generators 2. It can be seen that, in this case, the boundary layer Cinf has a thickness e2, smaller than the thickness e1, this reduction of thickness of the boundary layer being prompted by the presence of the vortex generators 2.

Figure 8A:
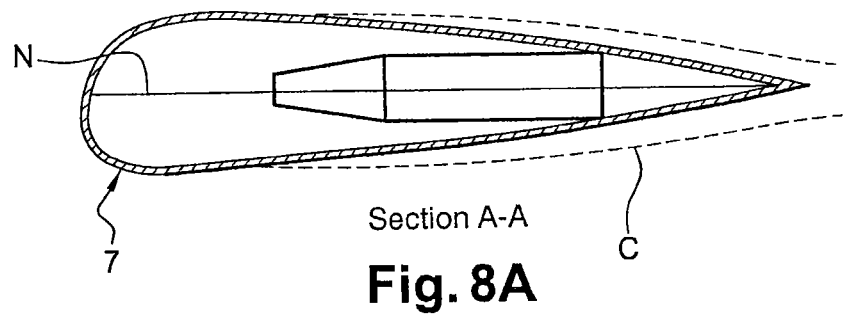
FIGS. 8A and 8B represent a top view of an engine pylon made according to a third embodiment of the method according to the invention.
Figure 8B:
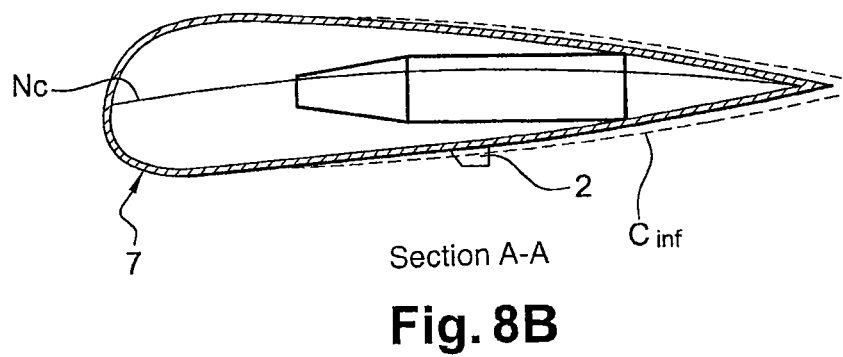

Owing to this diminishing of the thickness of the boundary layer Cinf, the invention makes it possible to achieve a gain in mass on the engine pylon. This gain in mass can be obtained in different ways:

by widening the main structure 9 of the pylon 7, as shown in FIGS. 6A and 6B, by shortening the aerodynamic shape of the box 8, as shown in FIGS. 7A and 7B, or by permitting a curvature of the pylon 7, as shown in FIGS. 8A and 8B.

In a first embodiment of the invention, the gain in mass is obtained by widening the main structure 9 of the pylon. It may be recalled that the main structure of the pylon is a structural part that enables the forces coming from the jet to be transmitted to the wing structure and to the entire structure of the aircraft. This main structure 9 has a substantially parallelepiped shape, as can be seen in FIG. 6A. In the invention, it is proposed to make a wider main structure 9, with aerodynamic iso-behavior. This widening of the main structure is of the order of 1 to 10%. As shown in FIG. 6B, the main structure is widened at its rectangular surface, its overall shape remaining parallelepiped. This widening of the main structure offers a better transmission of the absorption forces. With the transmission forces being facilitated, the main structure is less heavy.

In a second embodiment of the invention, the gain in mass is obtained by shortening the aerodynamic shape of the box 8 of the engine pylon. One example of this embodiment is shown in FIGS. 7A and 7B. FIG. 7A shows an example of a classic pylon, with a classic box shape and the boundary layer C. FIG. 7B shows an example of a pylon made according to the method of the invention. In this example, the main structure has classic dimensions, but the pylon box 8 has a shortened shape, i.e. its shape at the tip is shorter than it is for a classic box. This shortened shape is defined so that it passes through the dimensioning points P of the main structure 9. This diminishing of the length of the pylon box, of the order of 5 to 15%, induces an increase in the boat tail angles between the wing structure and the pylon. The invention thus enables the making of an engine pylon having boat tail angles that can be twice as big as those of the classic engine pylons, i.e. of the order of 20° to 40°.

In the absence of vortex generators, these boat tail angles would be unacceptable because they are too big and would give rise to a local flow separation. The vortex generators make the boundary layer more robust, this layer being then capable of taking bigger boat tail angles. This pylon box of limited dimensions offers both structural gains (a smaller mass because it has smaller dimensions) and aerodynamic gains (a smaller surface area).

In the two embodiments just described, the vortex generators are mounted symmetrically on either side of the pylon 7. In other words, the same number of vortex generators is mounted on the upper surface and the undersurface of the engine pylon. The boundary layer Cinf is therefore symmetrical on either side of the pylon.

In a third embodiment of the invention, the improvement of aerodynamic performance is obtained by the generation of a camber effect of the aerodynamic shape of the engine pylon. Indeed, generally, the air arriving at the engine pylon sees a rectilinear neutral line N corresponding to the axis of symmetry passing through the engine pylon. It is possible, according to the invention, to create a curvature effect by which the air arriving at the pylon sees the neutral line Nc as being curved and no longer rectilinear as shown in FIGS. 8A and 8B. This effect of curvature is created by mounting at least one fin on only one side of the engine pylon.

In the embodiment of FIGS. 8A and 8B, only one fin is mounted on the undersurface or on the upper surface of the engine pylon 7 so that the air flow is not distributed symmetrically on either side of the engine pylon. This asymmetrical distribution of the air flow, relatively to the axis of symmetry of the engine pylon, generates a camber of the pylon with aerodynamic iso-structure and iso-shape. As can be seen in FIG. 8B, this camber has a positive effect on the drag, the thickness of the boundary layer Cinf being smaller on the vortex generator 2 side than on the side without vortex generator.

Whatever the embodiment of the invention, the modification of shape of the engine pylon associated with the generation of the vortex generators on the pylon box provides for a gain in mass of the order of several tens of kilograms, this result being obtained with aerodynamic iso-behavior, i.e. aerodynamic behaviour identical to that of a classic aircraft. The gain in mass then provides for an improvement in the aerodynamic performance of the aircraft manufactured according to the method of the invention.

The invention claimed is:

1. An engine pylon for an aircraft wherein the engine pylon comprises:
   a pylon box around a main structure, the pylon box having an oblong shape along which an air boundary layer is formed during a flight of the aircraft; and
   at least one vortex generator mounted on the pylon box of the engine pylon, to modify thickness of the boundary layer, and in a longitudinal direction of the pylon box the at least one vortex generator is located between upstream and downstream ends of the main structure,
   and the main structure has a substantially parallelepiped shape with a width enlarged from 1 to 10% at its rectangular surface with respect to a corresponding width of a main structure of an engine pylon without a vortex generator for a same type aircraft as the aircraft, to improve transmission of absorption forces.

2. The engine pylon for an aircraft according to claim 1 wherein the engine pylon comprises:
   vortex generators mounted on the pylon box of the engine pylon, symmetrically on either side of the engine pylon, to modify the thickness of the boundary layer, and
   boat tail angles of an order of 20° to 40°.

3. The engine pylon for an aircraft according to claim 1 wherein
   the at least one vortex generator is mounted on only one side of the engine pylon to generate an effect of curvature of the engine pylon.

4. An aircraft comprising at least one wing structure, one jet engine and one engine pylon connecting the jet engine to the wing structure, wherein the engine pylon complies with any one of the claims 1 to 3.

5. The engine pylon for an aircraft according to claim 1, wherein the at least one vortex generator includes a length and a height, such that the length is equal to or greater than three times the height.

6. The engine pylon for an aircraft according to claim 1 wherein the engine pylon comprises:
   vortex generators mounted on the pylon box of the engine pylon, which are aligned in a vertical direction perpendicular to a longitudinal direction of the pylon box.

* * * * *